July 14, 1959 G. T. RONK 2,894,764
TRAILER-TRACTOR ASSEMBLY WITH REMOVABLE GOOSENECK
Filed Aug. 9, 1956 3 Sheets-Sheet 3

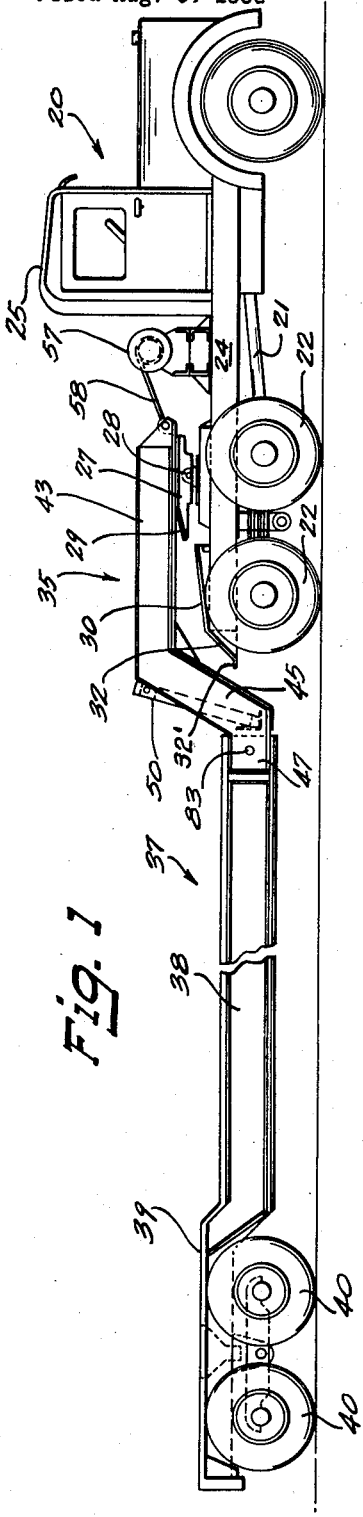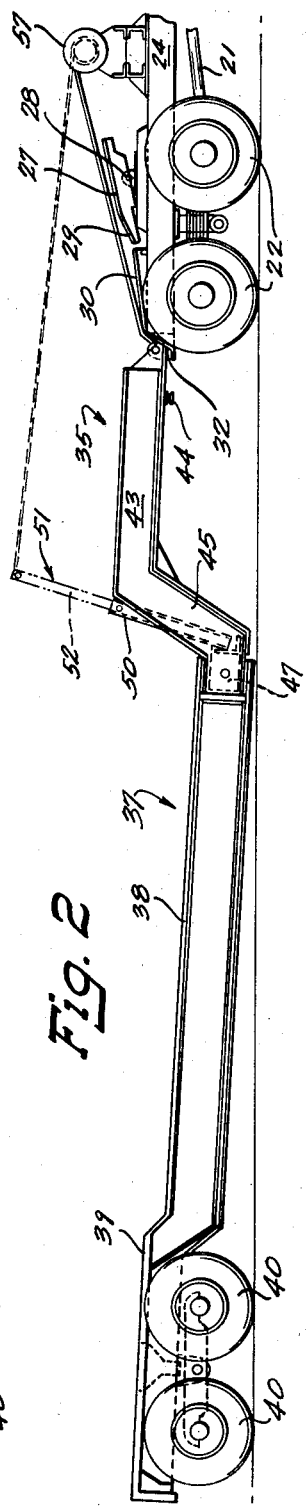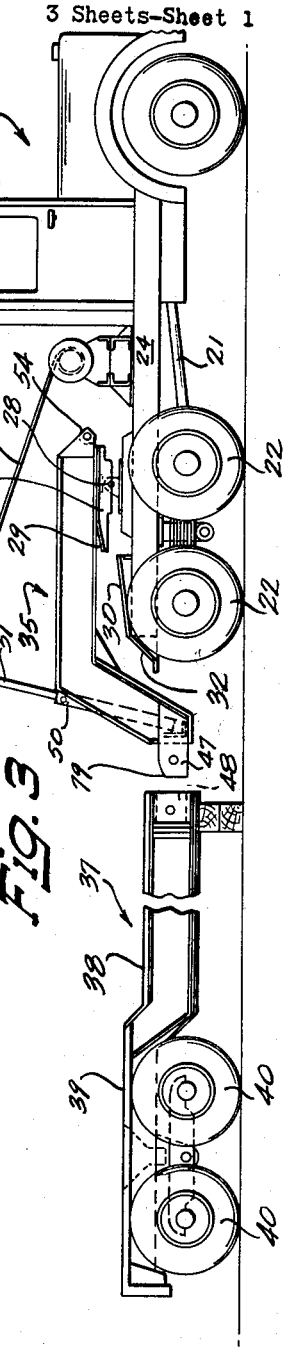

INVENTOR.
George T. Ronk
BY
Dorris, McDougall, Williams & Hersh
Attorneys

United States Patent Office 2,894,764
Patented July 14, 1959

2,894,764

TRAILER-TRACTOR ASSEMBLY WITH REMOVABLE GOOSENECK

George T. Ronk, Cedar Rapids, Iowa, assignor to Transport Trailers, Inc., Cedar Rapids, Iowa Application August 9, 1956, Serial No. 603,133

5 Claims. (Cl. 280—425)

This invention relates to a tractor-trailer assembly and means for connecting and disconnecting the trailer and tractor for loading and unloading the trailer. This invention relates more particularly to an assembly of the type described in which the trailer is of the low bed type that is adapted to be loaded and unloaded over the forward end.

This application is a continuation-in-part of my copending application Serial No. 419,268, filed March 29, 1954, and entitled "Low Ground-Clearance Trailer With Demountable Gooseneck," now abandoned.

As indicated by the description in the aforementioned copending application, the trailer forming the subject matter of this invention comprises a low bed trailer characterized by having a group of wheels at the rearward end portion for support of the trailer. The forward end portion is provided with a drawbar, in the form of a gooseneck, which has a rearward portion connected to the trailer and a raised forward portion which is adapted to be connected to the pivot pin of a fifth wheel member on the tractor which, in mounted position, supports the forward end portion of the trailer on the tractor for movement with the tractor in transportation.

Low bed trailers of the type described are intended for use in the transportation of large machinery and equipment where the head room available on the highways may not be sufficient to enable such equipment and machinery to be mounted on trailers having normal ground clearance. A low bed trailer enables the equipment to be located more closely to ground level so that more head space can be made available for passage under bridges, trestles and the like. The use of a low bed trailer, however, complicates loading and unloading of the trailer because the bed of the trailer often comes considerably below the wheels. In some instances, special equipment and ramps are required for conventional rear loading. Thus it becomes desirable to be able to drop the front end of the trailer and to remove the gooseneck for enabling access to the front end of the trailer for loading and unloading without obstruction by the wheels or other raised portions of the structure.

Separation of the gooseneck from the trailer and from the tractor leads to a number of problems such as proper alignment to effect a suitable connection between the gooseneck and trailer and raising the gooseneck with the trailer into operative connection with the fifth wheel on the tractor. Briefly described, the rearward end portion of the separable gooseneck is usually provided with a pair of laterally spaced apart rearwardly extending horns which are adapted to be received in aligned sockets suitably provided in the forward end portion of the trailer frame and the interfitting members are secured one to the other in a manner to militate against relative movements thereby to effect an operative and rigid connection between the gooseneck and trailer. Instead of having the horns on the gooseneck and the sockets in the trailer, the elements can be reversed to place the horns on the trailer with the sockets in the gooseneck.

When the gooseneck is separated from the trailer so that the forward end portion of the latter can be dropped to the ground for loading and unloading equipment thereon, it becomes necessary subsequently properly to align the gooseneck and trailer to permit entrance of the horns smoothly into the sockets for re-establishing an operative connection. Proper alignment is complicated by the differences in height of the released end of the trailer with respect to the tractor and the different levels and slopes of the ground on which the trailer and tractor are at rest.

Thus it is an object of this invention to produce a structure of the type described embodying new and novel means for interconnecting and for disconnecting a tractor and trailer and it is a related object to produce a structure of the type described which makes use of a demountable gooseneck and means for effecting proper alignment for connection of the gooseneck with the tractor and trailer.

Another object is to provide means of the type described which enables alignment between the various elements to be effected in a rapid and efficient manner and it is a related object to embody means which utilizes the power available from the tractor properly to align and interconnect the elements for movement.

These and other objects and advantages of this invention will hereinafter appear and for purposes of illustration, but not of limitation, embodiments of the invention are shown in the accompanying drawing in which—

Figure 1 is a side elevational view of a low ground clearance trailer operatively connected to a tractor and which embodies the concepts of this invention;

Figure 2 is a view similar to that of Figure 1 showing the trailer in a position partially demounted from the tractor;

Figure 3 is an elevational view similar to that of Figures 1 and 2 showing the bed of the trailer separated from the gooseneck on the tractor;

Figure 4:
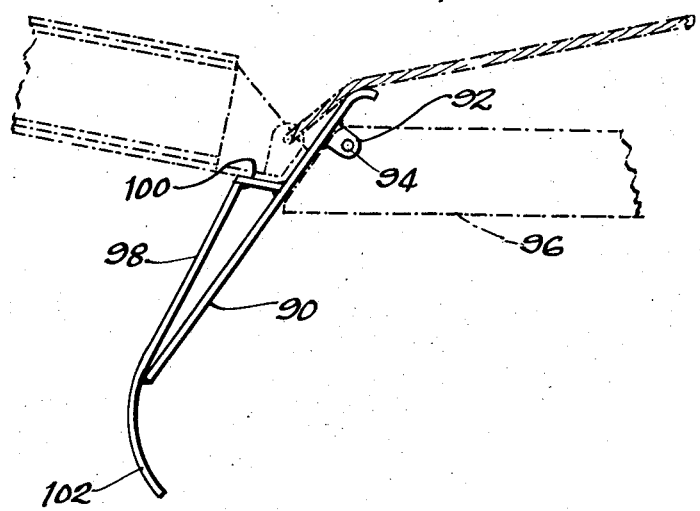
Figure 4 is a fragmentary elevational view on the rearward end portion of the tractor showing a modified form of ramp structure embodying the features of this invention.
Figure 5:
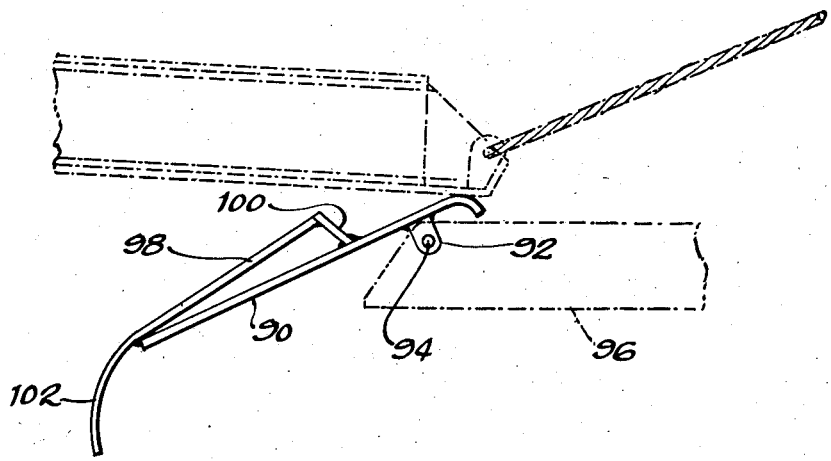
Figure 5 is a view similar to that of Figure 4 showing the arrangement of parts during an intermediate stage in the mounting of the gooseneck on the tractor.

It has been found, in accordance with the practice of this invention, that a more flexible arrangement can be achieved in a simpler and more efficient manner by a system which makes use of an entirely different force relationship. Instead of making use of a crossbar which requires linear and angular adjustment on the ramp for use as an abutment to provide the pivot point about which the forward end portion of the gooseneck can be rocked, the concept described herein relies upon the development of an angular relationship between the ramp and the resultant of the force operative on the gooseneck to cause the gooseneck to rock freely about the ramp as a pivot at any point of contact to provide means whereby the gooseneck can be disposed at any desired level on the ramp for rocking movement to raise or lower the rearward end portion of the gooseneck without endwise displacement on the ramp, even without stops or the like.

For this purpose, it is desirable to mount the ramp on the rearward end portion of the tractor at an angle with the vertical of about 36°±6°. The point at which the force is applied to the gooseneck for pivotal movement is adapted to have a resultant which, when measured from the point of application to the end of the gooseneck, is substantially perpendicular to the inclined face of the ramp. In practice, it is desirable to have the resultant of the force applied to the gooseneck make an angle of about 90°±8° with the ramp. Under these conditions, the application of force on the gooseneck will pull the forward end of the gooseneck into a contacting relation across the inclined surface of the ramp. Continued application of force, as by means of a winch on the tractor, will thereafter cause the gooseneck to rock about the line of contact with the ramp as a pivot without the necessity of making use of abutments or other stops to prevent endwise displacement of the end portion of the gooseneck on the ramp.

After the horns have been locked into their respective sockets and when it is desired to move the forward end portion of the gooseneck up the ramp into operative engagement with the fifth wheel on the tractor, the operative force is removed from the rearward end portions of the tractor and connected instead to the forward end portion of the gooseneck whereby the resultant causes the gooseneck to be displaced up the ramp into the fifth wheel for attachment.

Since the ramp is mounted at a relatively sharp incline, it is expedient, in the preferred practice of this invention, to mount the ramp for pivotal movement onto the tractor about a crosswise axis spaced a short distance below the upper end portion of the ramp. Under such circumstances, the ramp will constantly be urged by gravitational force to seek a position at the desired angle on the tractor for pivoting the gooseneck thereon but will be automatically rocked upwardly about its pivot into more substantial alignment with the fifth wheel on the tractor in response to the passage of the forward end portion of the gooseneck upwardly on the ramp beyond the pivot thereby to achieve alignment immediately prior to displacement from the ramp onto the fifth wheel.

Figure 6:
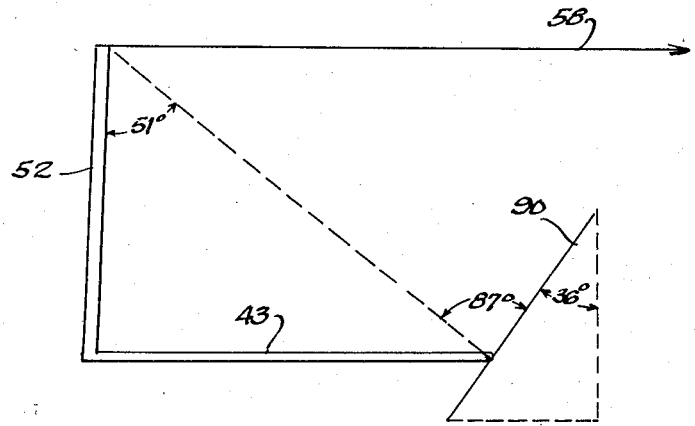
Figure 6 is a diagrammatic view showing the angular relationship between elements.
Figure 7:
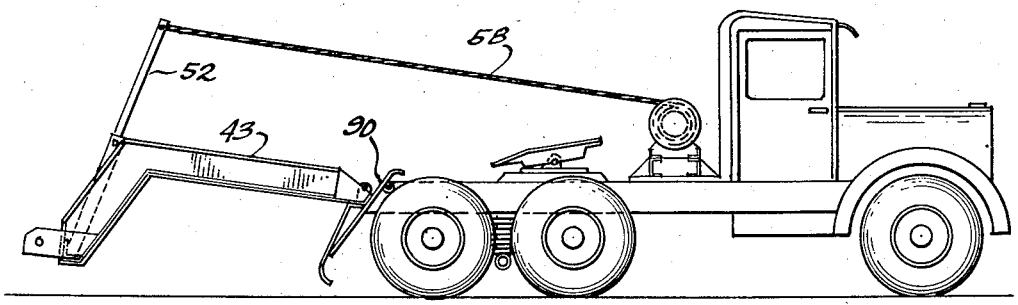
Figure 7 is an elevational view showing the modification of Figures 4 and 5 on the tractor of Figures 1-3.

The described angular relationship is illustrated in Figure 6 of the drawings wherein the ramp is disposed at an angle of about 36° with the vertical and the resultant force applied to the extended arms by the winch is about 51° with the vertical thereby to provide an angular relationship of about 87° between the ramp and the resultant of the applied force at the point of contact between the end of the gooseneck 43 and the ramp 90. Under these circumstances, the gooseneck will be rocked automatically about the ramp upon the application of force without the necessity to make use of abutments or other stop means for blocking movement of the forward end portion of the gooseneck of the ramp.

Referring now more specifically to the drawings, the numeral 20 indicates a tractor of conventional construction having the usual internal combustion engine in the forward end and a drive shaft 21 to supply power to the rear wheels 22. The tractor 20 is provided with a platform 24 behind the driver's cab 25. The platform 24 supports a fifth wheel 27 which is pivotally mounted for rocking movement about a horizontally disposed axis 28. The fifth wheel, which is of circular configuration, is formed with a forwardly extending apron 29 which when tilted rearwardly to its lowermost position becomes substantially aligned with a ramp 30. The ramp 30 is formed of a number of sections including a rearwardly inclined section which terminates into a ramp which slopes downward at an angle of about 30°–42° with the vertical and which terminates further into a horizontally disposed step 32' upon which the forward end portion of the gooseneck may rest.

The fifth wheel 27 is adapted to be connected with the forward end portion of a gooseneck 35 having a rearward end portion adapted operatively to be engaged with the forward end portion of a low platform trailer 37 for carrying the trailer on the tractor from place to place. The trailer 37 has a low clearance main platform 38 and a slightly elevated platform 39 in the rearward end portion necessitated by the rear wheels 44 which support the rearward end portion of the trailer.

The gooseneck 35 comprises a pair of horizontally disposed beams 43, the forward ends of which are supported during transportation on the upper surface of the fifth wheel 27. A vertical pivot pin 44 on the forward end portion of the gooseneck is adapted to be received in a socket at substantially the geometric center of the fifth wheel for pivotally connecting the gooseneck to the tractor. The rear ends of the beams 43 are joined to rearwardly and downwardly sloping posts 45 and the lower ends of the posts are provided with rearwardly extending, horizontally disposed tapered horns 47 adapted to be received for engagement in correspondingly tapered apertures or sockets 49 in the forward end portion of the trailer platform.

A pair of cylindrical sockets 50 are provided in the posts 45 at the rearward end portion of the gooseneck for telescopically receiving a bail means including manipulating frame 51. The frame 51 comprises a pair of tubular members 52 joined at their upper ends by a crossbar 53. The posts 52 are slidable upwardly within their sockets 50 to between a raised and retracted position of adjustment. In the raised position, the horizontal bar 53 extends above the level of the horizontal beams 43 by a distance which, when measured from the bar to the forward end portion of the gooseneck, provides a line which is substantially perpendicular to the inclined portion of the ramp 32±8°. The angular relationship which is provided gives sufficient leverage and balance to cause the gooseneck to be rocked about the ramp as a pivot upon engagement in response to the application of force from the tractor to the extended bar 53 of the gooseneck. The posts 52 can be dropped to collapsed position for clearance when the trailer is loaded and in transporting position. The forward end portions of the beams 43 are provided with an incline 54 that assists in drawing the gooseneck upwardly over the apron 32 when the applied force from the winch is connected to the forward end portion of the gooseneck. An ear 54 is mounted on the incline to provide a convenient attaching means for the cable 58 which is payed out from the winch 57.

A brake winch 57 contains the coiled cable 58, the end of which is provided with means for attachment with the forward end portion of the beams through the ear 54 to drag the forward end portion of the gooseneck over the ramps 32 and 30 and onto the upper surface of the fifth wheel 27 to bring the pivot pin 44 into engagement with the socket of the fifth wheel 27. The pivot pin 44 may be locked in the socket of the fifth wheel by conventional means.

When the gooseneck is demounted from the trailer bed 37, the ends of the cable 58 may be connected to the upper ends of the posts 52 in their extended position to manipulate the gooseneck or to keep the lower rear end of the gooseneck elevated from the purpose of travelling with the forward end of the gooseneck in pivotal engagement with the ramp 32, as shown in Figure 10 of the drawings, or against the fifth wheel, as shown in Figure 9 of the drawings, or with the pivot pin 44 mounted in the socket of the fifth wheel as shown in Figure 3 of the drawings.

In the modification illustrated in Figures 13 and 14 of the drawings, the ramp represented by the numeral 90 is provided with ears 92 extending rearwardly from the lateral edges of the ramp spaced a short distance from the upper end thereof. The ears are pivotally mounted on pins 94 secured to the rearward end portion of the truck frame pivotally to mount the ramp for rocking movement about a horizontal axis. The rearward end portion 96 of the truck frame provides an abutment tapered to position the ramp in its normal lowered position of adjustment at an angle of about 36°±6° with the vertical.

Fixed to the front wall of the ramp 90 about midway between the ends and below the pivot is a plate 98 having a rearwardly extending, downwardly inclined upper end portion 100 which provides a crosswise ledge on which the forward edge portion of the gooseneck is adapted to come to rest on the ramp. The remainder of the plate 98 extends downwardly alongside the adjacent portions of the ramp and the lower end portion 102 extending downwardly beyond the bottom end of the ramp is turned curvilinearly forwardly beyond the ramp to provide a curvilinear entrance portion for guiding the forward end of the gooseneck upwardly onto the ramp from a position of rest on the ground, as will hereinafter be described.

In operation, when it is desired to disengage the trailer bed from the tractor and from the gooseneck, the flaps (not shown) provided to block outward movement of tapered pins from their assembled relation, are rocked upon their pivots out of the path of the tapered pins and the tapered pins are driven outwardly from the aligned tapered openings in the sockets 48 and horns 47 for enabling the horns to be separated from the sockets. As the tractor is driven forwardly with the brakes 40 of the trailer locked, the horns are withdrawn from the sockets and the gooseneck is thus separated from the trailer.

The gooseneck may be dropped from the tractor upon continued forward movement of the tractor after the forward end portion of the gooseneck has been released by the pin from the fifth wheel. It is preferred, however, to disengage the elements by first releasing the locking pin securing the forward end portion of the gooseneck to the fifth wheel and then drive the tractor forwardly to bring the forward end portion of the gooseneck to rest on the ledge 100 on the ramp. In this way, the gooseneck and trailer are lowered to about ground level.

When the tapered pins are removed and the tractor run further forwardly, the horns can be separated from the sockets and the forward end portion of the trailer will drop a short distance to the ground. Before disconnecting the gooseneck from the trailer, the cable 58 is connected to the frame 51 to support the gooseneck on the tractor, as shown in the position in Figure 10. In this position, the gooseneck can be carried about by the tractor to a different location. For dropping the gooseneck onto the ground, the cable 58 is let out by the winch 57 to enable the rearward end portion of the gooseneck to be rocked down to the ground. Upon removal of the cable and upon further movement forwardly of the tractor, the gooseneck will be released.

To connect the gooseneck with the tractor and trailer, it is desirable first to back up the tractor to bring the ramp 90 immediately above the forward end portion of the gooseneck. The cable is then connected to the forward end portion of the gooseneck and taken up by the winch. As the cable is taken up, the forward end portion of the gooseneck is raised into operative engagement with the curvilinear end portion 102 of the plate for guiding the forward end portion of the gooseneck upwardly onto the ramp. When the forward end portion is raised to the desired position on the ramp, the cable 58 is disconnected from the forward end portion of the gooseneck and connected to the frame 51. As the cable is taken up, the force reaction causes the gooseneck to rock about the ramp as a pivot. A small amount of take-up will result in a relatively small amount of rise thereby to enable the forward end portion of the gooseneck to be adjusted easily and efficiently in a manner to bring the horns and sockets into an approximate alignment with each other. It is unnecessary perfectly to align these elements because the taper in one enables entrance of the other even when slightly out of alignment. When the tractor is thus backed up into the trailer, the elements are cammed into alignment as the horns are rammed home into the sockets. The pins 83 can then be inserted through the aligned openings to lock the horns and sockets together.

After the gooseneck and trailer has been thus connected, a cable 58 is disconnected from the frame 51 and again secured to the forward end portion of the gooseneck. As the cable is taken up, the forward end portion of the gooseneck is displaced up the ramp and over the frame onto the fifth wheel into which it is locked by the latching pin. As the gooseneck travels up the ramp to a point beyond the pivot 92, the ramps rocks upwardly about its pivot to change the line of travel of the gooseneck into alignment with the fifth wheel.

It will be understood that changes may be made in the details of construction, arrangement and operation without departing from the spirit of the invention, especially as defined in the following claims.

I claim:

1. For a trailer and tractor unit in which the trailer has a coupling means at the forward end and in which the tractor has a winch means on the rearward end portion, a power means for operating the winch means and a fifth wheel, a gooseneck for coupling the trailer to the tractor comprising a frame having a rearwardly extending portion and means on the end of the rearwardly extending portion for engagement with the coupling means on the trailer, a forwardly extending portion at a higher level than the rearwardly extending portion, bail means extending upwardly from the rearwardly extending portion of the gooseneck frame to a higher level than the forwardly extending portion of the gooseneck and means on the upper portion of the bail for operative connection with the winch, and means on the tractor for cooperating with the gooseneck including a ramp on the rearward end portion of the tractor mounted at a lower level than the winch means and disposed at an angle which, at the point of contact between the forward end portion of the gooseneck and the ramp, from a line drawn from the means of attachment on the bail to the point of contact on the ramp, makes an agle of about 90°±8° with the ramp.

2. A trailer-tractor unit as claimed in claim 1 in which the ramp is formed with an upwardly extending offset intermediate the ends to provide a horizontally disposed upwardly facing step extending crosswise of the ramp and a lower end portion extending curvilinearly forwardly to provide a guide cam surface for guiding the forward end portion of the gooseneck onto the ramp, and a substantially continuous flat surface from the curvilinear end portion to the step.

3. A trailer-tractor unit as claimed in claim 1 in which the ramp is disposed at an agle of 36°±6° with the vertical.

4. A trailer-tractor unit as claimed in claim 1 in which the ramp is pivotally mounted in closely spaced relation at its upper end portion on the trailer for rocking movement about a horizontal axis between a lowered position in which the ramp makes an angle of 36°±6° with the vertical and a raised position in substantial endwise alignment with the fifth wheel.

5. For a trailer and tractor unit in which the trailer has coupling means at the forward end and in which the tractor has a winch means on the rearward end portion, a power means for operating the winch means, and a fifth wheel; a gooseneck for coupling the trailer to the tractor comprising a frame having a rearward extending portion and a forward extending portion with the forward extending portion at a higher lever than the rearward extending portion, a bail rigid with the rearwardly extending portion of the frame and shiftable in a vertical direction relative thereto from a collapsed position to a raised position at which the end of the bail is at a higher lever than the forward end portion of the gooseneck frame, and means on the tractor to cooperate with the gooseneck in effecting the mounted and unmounted relation between the gooseneck and the trailer and the gooseneck and the tractor including a ramp pivotally mounted on the rearward end portion of the tractor independently of the fifth wheel for rocking movement about a horizontal axis between a normal position at an angle of 36°±6° with the vertical and a raised position in substantial alignment with the fifth wheel on the tractor, said ramp having a horizontally disposed rest intermediate its ends and a lower portion extending curvilinearly forwardly to provide a cam surface for guiding the forward end portion of the gooseneck onto the ramp.

References Cited in the file of this patent

UNITED STATES PATENTS

| | | |
|---|---|---|
| 1,568,168 | Land | Jan. 5, 1926 |
| 2,489,112 | Talbert | Nov. 22, 1949 |
| 2,730,376 | Martin | Jan. 10, 1956 |